(12) United States Patent
Dejaeger et al.

(10) Patent No.: US 6,286,758 B1
(45) Date of Patent: Sep. 11, 2001

(54) RECONFIGURABLE CHECKOUT SYSTEM

(75) Inventors: Wilfried E. Y. Dejaeger, Duluth; Mark S. Hoffman, Lawrenceville; Terry M. Glogovsky, Sugar Hill; Alfred J. Hutcheon, Alpharetta, all of GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/250,859

(22) Filed: Feb. 17, 1999

(51) Int. Cl.$^7$ ..................................................... G06K 15/00
(52) U.S. Cl. ........................ 235/383; 235/459; 235/462.14
(58) Field of Search ................................... 235/383, 379, 235/381, 382, 439, 459, 462.14; 902/22

(56) References Cited

U.S. PATENT DOCUMENTS

| | | | |
|---|---|---|---|
| 3,688,873 | 9/1972 | Potrafke | 186/1 A |
| 3,725,895 | 4/1973 | Haynes | 340/280 |
| 4,676,343 | 6/1987 | Humble et al. | 186/61 |
| 4,779,706 | 10/1988 | Mergenthaler | 186/61 |
| 4,787,467 | 11/1988 | Johnson | 177/50 |
| 4,789,048 | * 12/1988 | Cramer et al. | 186/61 |
| 4,792,018 | 12/1988 | Humble et al. | 186/61 |
| 4,909,356 | 3/1990 | Rimondi et al. | 186/61 |
| 4,940,116 | 7/1990 | O'Connor et al. | 186/61 |
| 4,947,028 | 8/1990 | Gorog | 235/381 |
| 4,964,053 | 10/1990 | Humble | 364/466 |
| 4,971,177 | * 11/1990 | Nojiri et al. | 235/383 X |
| 5,083,638 | 1/1992 | Schneider | 186/61 |
| 5,115,888 | 5/1992 | Schneider | 186/61 |
| 5,168,961 | 12/1992 | Schneider | 186/52 |
| 5,174,413 | 12/1992 | Cappi et al. | 186/66 |
| 5,250,789 | 10/1993 | Johnsen | 235/383 |
| 5,375,680 | 12/1994 | Ikeda et al. | 186/61 |
| 5,378,860 | 1/1995 | Dingfelder et al. | 177/25.19 |
| 5,424,524 | 6/1995 | Ruppert et al. | 235/462 |
| 5,426,282 | 6/1995 | Humble | 235/383 |
| 5,434,394 | 7/1995 | Roach et al. | 235/375 |
| 5,437,346 | 8/1995 | Dumont | 186/61 |
| 5,478,989 | 12/1995 | Shepley | 235/375 |
| 5,494,136 | 2/1996 | Humble | 186/61 |
| 5,497,314 | 3/1996 | Novak | 364/403 |
| 5,497,853 | 3/1996 | Collins, Jr. et al. | 186/61 |
| 5,543,607 | 8/1996 | Watanabe et al. | 235/383 |
| 5,544,040 | 8/1996 | Gerbaulet | 364/401 R |
| 5,560,450 | 10/1996 | Kouno | 186/61 |
| 5,609,223 | 3/1997 | Iizaka et al. | 186/61 |
| 5,662,190 | 9/1997 | Abe | 186/61 |
| 5,684,289 | * 11/1997 | Detwiler et al. | 235/383 X |
| 5,708,782 | 1/1998 | Larson et al. | 395/214 |
| 5,747,784 | 5/1998 | Walter et al. | 235/383 |
| 5,752,582 | 5/1998 | Hayward | 186/61 |
| 5,801,371 | 9/1998 | Kahn et al. | 235/472 |
| 5,832,457 | 11/1998 | O'Brien et al. | 705/14 |
| 5,845,259 | 12/1998 | West et al. | 705/14 |
| 5,845,263 | 12/1998 | Camaisa et al. | 705/27 |
| 5,884,281 | 3/1999 | Smith et al. | 705/26 |
| 5,884,728 | * 3/1999 | d'Estaintot et al. | 186/62 |
| 5,886,336 | * 3/1999 | Tang et al. | 235/383 X |
| 5,890,135 | 3/1999 | Powell | 705/14 |
| 6,047,889 | * 4/2000 | Williams et al. | 235/383 |
| 6,213,395 | * 4/2001 | Dejaeger et al. | 235/383 |

* cited by examiner

Primary Examiner—Michael G. Lee
Assistant Examiner—Daniel St.Cyr
(74) Attorney, Agent, or Firm—Paul W. Martin

(57) ABSTRACT

A reconfigurable checkout system which is suited for self-service and full-service operation. The system includes a first portion including a dual-aperture bar code scanner rotatably mounted within the first portion. The dual-aperture bar code scanner is rotatable between a full-service position and a self-service position. The system further includes a second portion coupled to the first portion containing a bagging area for use in full-service and self-service checkout operations.

1 Claim, 5 Drawing Sheets

RECONFIGURABLE CHECKOUT SYSTEM

BACKGROUND OF THE INVENTION

The present invention relates to point-of-service checkout systems and more specifically to a reconfigurable checkout system.

Traditionally, checkout systems have included islands for servicing one lane and one customer per island at a time. Such systems have included scanners at the end of a conveyor belt and a point-of-service terminal, separated from the scanner and located in front of the point-of-service operator.

With the evolution of high performance dual-aperture bar code scanners, these systems have been self-service or full-service island, but not a combination of both. The dual-aperture bar code scanners have a vertical window which must face the operator in order to easily scan items. Thus, checkout systems which contain dual-aperture bar code scanners offer retailers very little flexibility to reconfigure their stores with more or less of either full-service and self-service checkout systems.

Therefore, it would be desirable to provide a checkout system containing a dual-aperture bar code scanner which is suitable for self-service as well as full-service operation.

SUMMARY OF THE INVENTION

In accordance with the teachings of the present invention, a reconfigurable checkout system is provided.

The system includes a first portion including a dual-aperture bar code scanner rotatably mounted within the first portion. The dual-aperture bar code scanner is rotatable between a full-service position and a self-service position. The system further includes a second portion coupled to the first portion containing a bagging area for use in full-service and self-service checkout operations.

It is accordingly an object of the present invention to provide a reconfigurable checkout system.

It is another object of the present invention to provide a reconfigurable checkout system which easily facilitates full service as well as self-service operations.

It is another object of the present invention to provide a reconfigurable checkout system which includes a mechanism for rotating a dual-aperture bar code reader between full-service and self-service positions.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
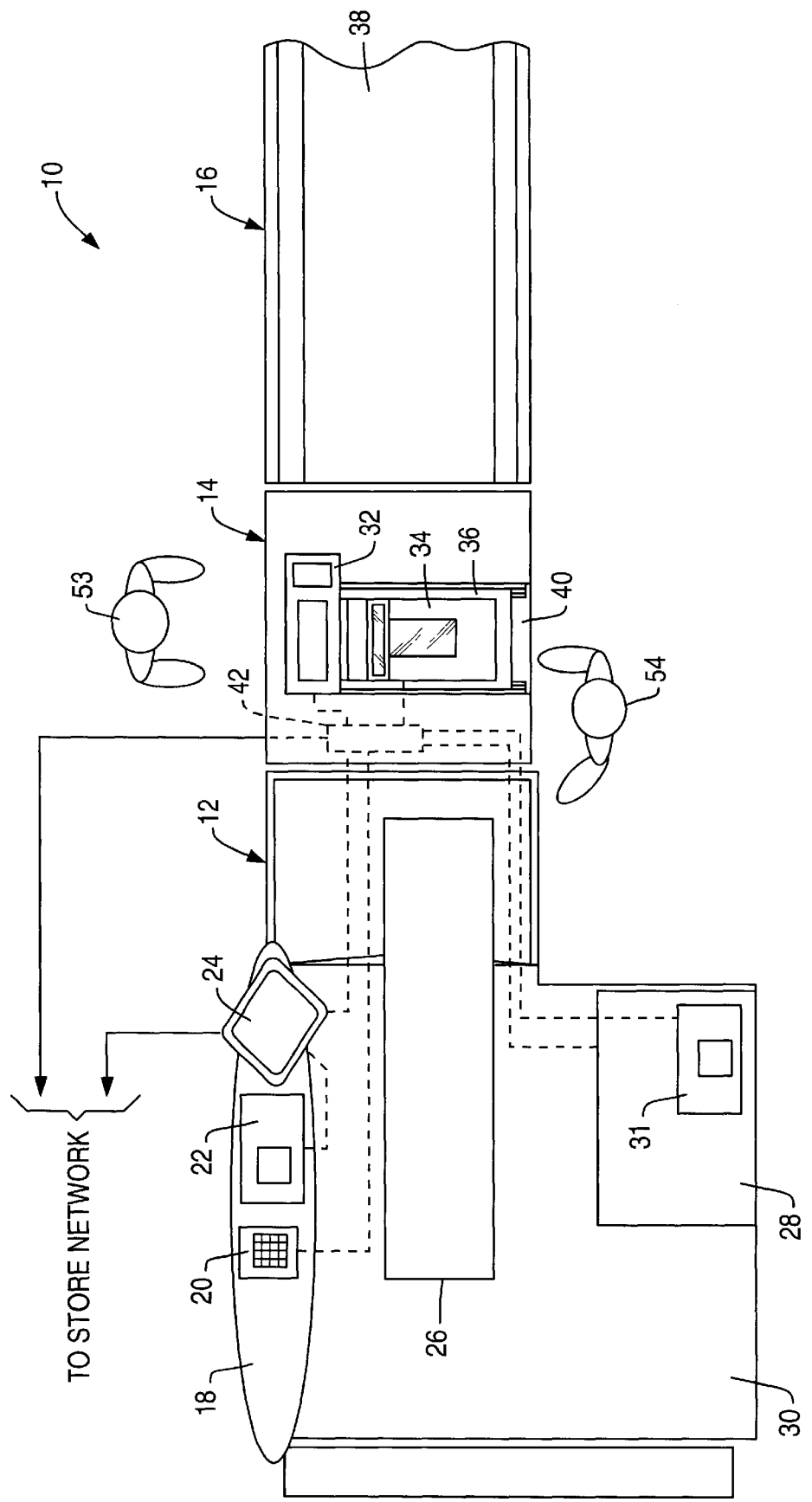
FIG. 1 is a top view of the checkout system of the present invention configured as a full-service checkout island.

Referring now to FIG. 1, system 10 of the present invention is configured as a full-service checkout island and includes bagging portion 12, scanning portion 14, and receiving portion 16.

Bagging portion 12 includes customer service table 18, conveyor 26, cash drawer 28, bagging shelf 30, and receipt printer 31.

Customer service table 18 provides a convenient writing surface and includes card reader with pin keypad 20, customer receipt printer 22, and customer display 24.

Card reader 20 is operational in both full and self-service configurations.

Printer 22, though present in the full-service configuration, is intended primarily for operation as a receipt printer during the self-service mode of operation. Printer 31 is used for full-service operation.

Customer display 24 operates as a customer information terminal during full-service operation and a customer-operated transaction terminal during self-service operation. Customer display 24 is preferably connected to a store network. An NCR 7401 computer terminal is suitable for use as customer display 24.

Conveyor 26 supports and transports merchandise items to bagging shelf 30. Conveyor 26 preferably telescopes to allow portion 44 of bagging portion 12 to be lowered to become a bagging shelf in the self-service mode of operation.

Cash drawer 28 is operated by a full-service checkout employee and allows the employee to process cash and check payments and dispense change.

Scanning portion 14 includes terminal interface 32, dual-aperture bar code scanner 34, and terminal 42.

Terminal interface 32 provides an operator with control during a full-service checkout operation. Terminal interface 32 includes either a display 46 and keypad 48 or a touch screen and is mounted above the vertical aperture portion of dual-aperture bar code scanner 34. An NCR Dynakey® terminal is suitable for use as terminal interface 32.

Dual-aperture bar code scanner 34 includes vertical aperture 50 and horizontal aperture 52. Horizontal aperture 52 is substantially flush with the top surface of scanning portion 14 and may be part of a scale weigh plate if dual-aperture bar code scanner 34 is equipped with a scale. An NCR 7875 scanner is suitable for use as scanner 34.

Vertical aperture 50 and its associated scanner housing portion are above the top surface of scanning portion 14. Vertical aperture 50 faces an operator during scanning. Thus, in the full-service configuration of FIG. 1, full-service checkout employee 54 can easily scan merchandise items using scanning light beams from both vertical and horizontal apertures 50 and 52.

Terminal 42 is located within scanning portion 14. Terminal 42 is preferably connected to a store network. During full-service operation, terminal 42 controls card reader 20, cash drawer 28, receipt printer 31, terminal interface 32, and dual-aperture scanner 34.

Receiving portion 16 includes conveyor 38.

During full-service operation, customer 56 approaches receiving portion 16 and places merchandise items on conveyor 38.

Employee 54 scans barcoded merchandise items using dual-aperture bar code scanner 34. Employee 54 may alternatively process bar coded merchandise items by entering price look-up numbers into terminal interface 32. Employee 54 also processes non-barcoded items, such as produce items using the scale of dual-aperture bar code scanner 34 and terminal interface 32. Employee 54 moves all merchandise items to bagging portion 12.

Customer 56 moves to customer service table 18 to wait for all items to be processed by employee 54 and to complete payment. While waiting, customer 56 may view promotional material displayed by display 24 or use customer display to find information about products, answer surveys, or select coupons. Payment may be recorded by card reader 20.

Following payment, employee 54 hands a receipt from receipt printer 31 to customer 56. Customer 56 then removes the items from bagging portion 12.

Figure 2:
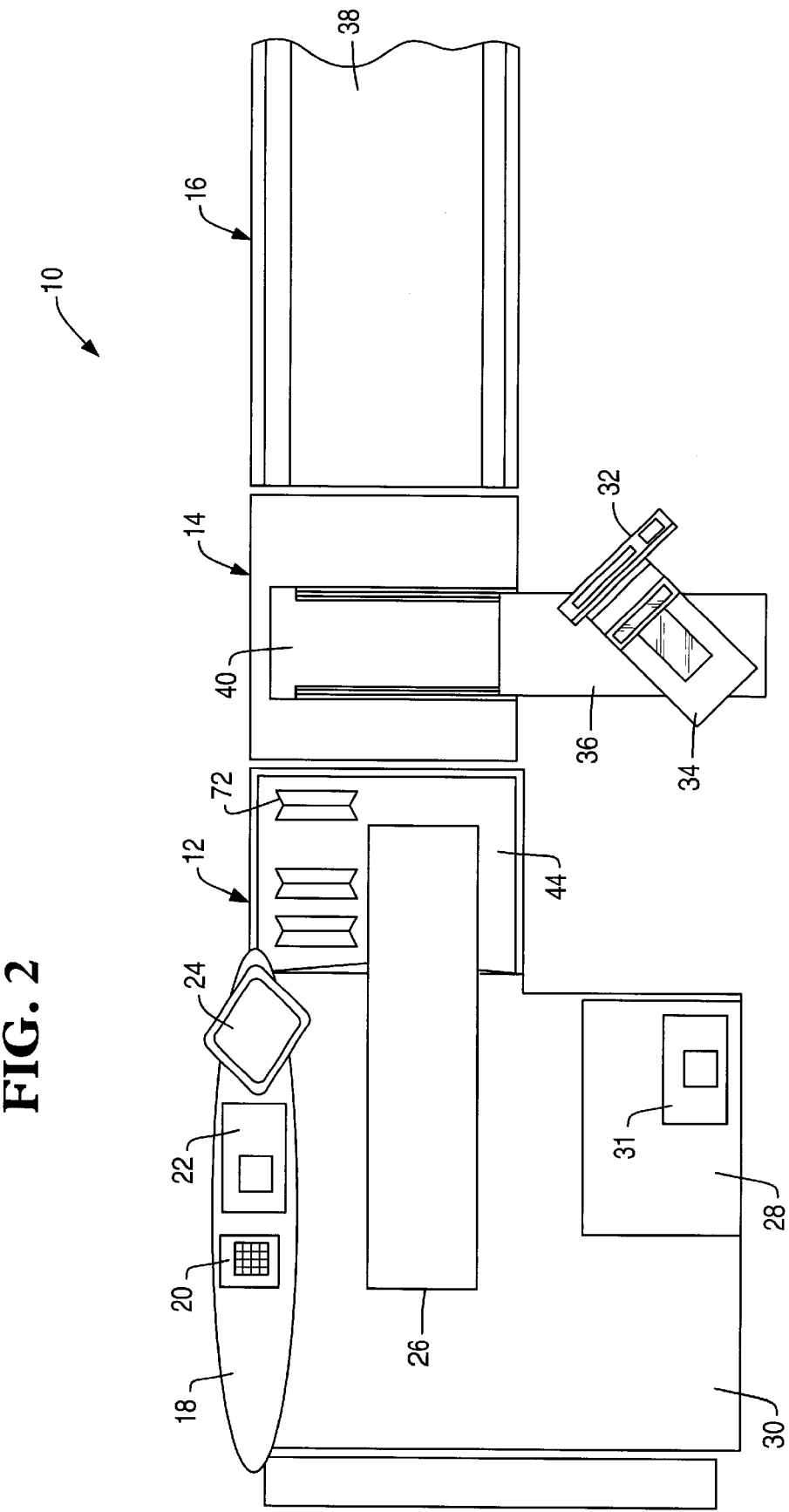
FIG. 2 is a top view of the checkout system of the present invention in the process of being reconfigured as a self-service checkout island.
Figure 3:
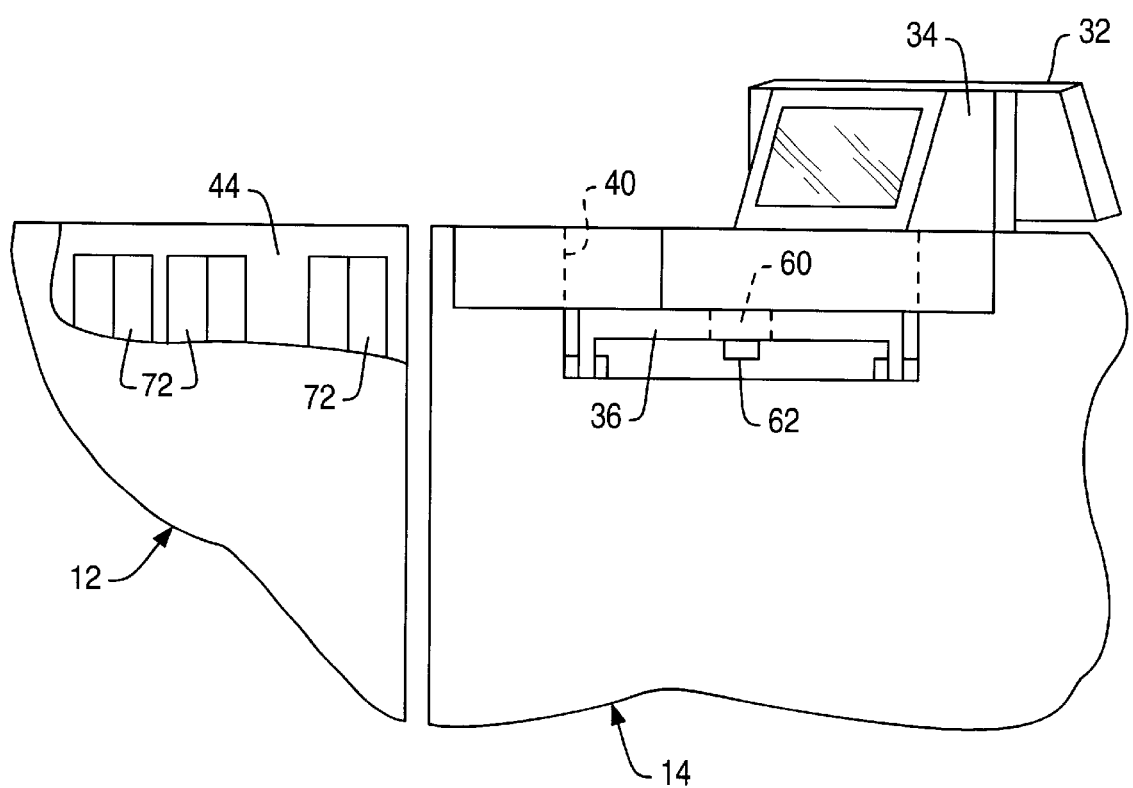
FIG. 3 is a side view of the checkout system as shown in FIG. 2 showing a drawer for rotating a dual-aperture bar code reader.

Turning now to FIGS. 2 and 3, the initial step in converting checkout system 10 to a self-service checkout system is to rotate scanner 34 so that it faces customer 56.

With reference to FIG. 2, drawer 36 is first removed from scanner well 40. Terminal interface 32 is then folded down behind the vertical portion of scanner 34.

With reference to FIG. 3, scanner 34 is rotatably mounted on drawer 36 using pivot pipe 60. Wiring 62 from scanner 34 extends through pivot pipe 60 and follows the underside of drawer 36 to terminal 42.

Conveyor 26 is reconfigured to allow portion 44 of bagging portion 12 to be lowered to become a bagging shelf in the self-service mode of operation.

Figure 4:
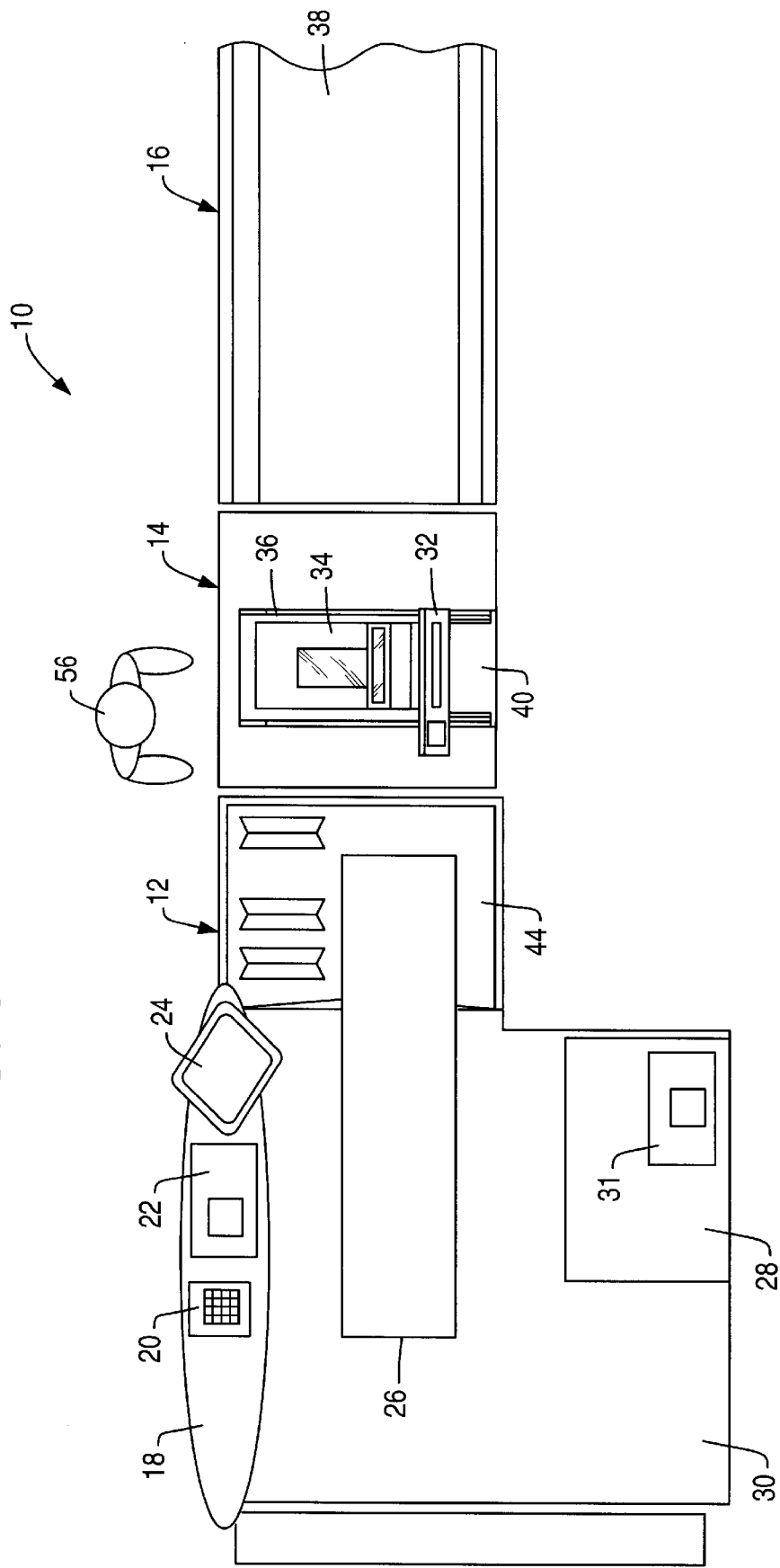
FIG. 4 is a top view of the checkout system of the present invention configured as a first type of self-service checkout island.

Thus, with reference to FIG. 4, checkout system 10 is shown in a first self-service configuration. In a second self-service configuration (FIG. 5), receiving portion 16 is removed to allow shopping cart 70 to be placed adjacent scanning portion 14. Otherwise, operation is similar for both the first and second self-service configurations.

Dual-aperture bar code scanner 34 faces customer 56.

Customer display 24 operates as a transaction terminal and takes customer 56 through the steps necessary to process and pay for merchandise items. For this purpose, customer display controls dual-aperture bar code scanner 34 and card reader 20 through terminal 42. Customer display 24 directly controls customer receipt printer 22. Cash drawer 28 and receipt printer 31 are inoperative during self-service operation.

Alternatively, in a single-computer configuration, customer display 24 may instead be a second terminal interface 32 for controlling terminal 42.

Figure 5:
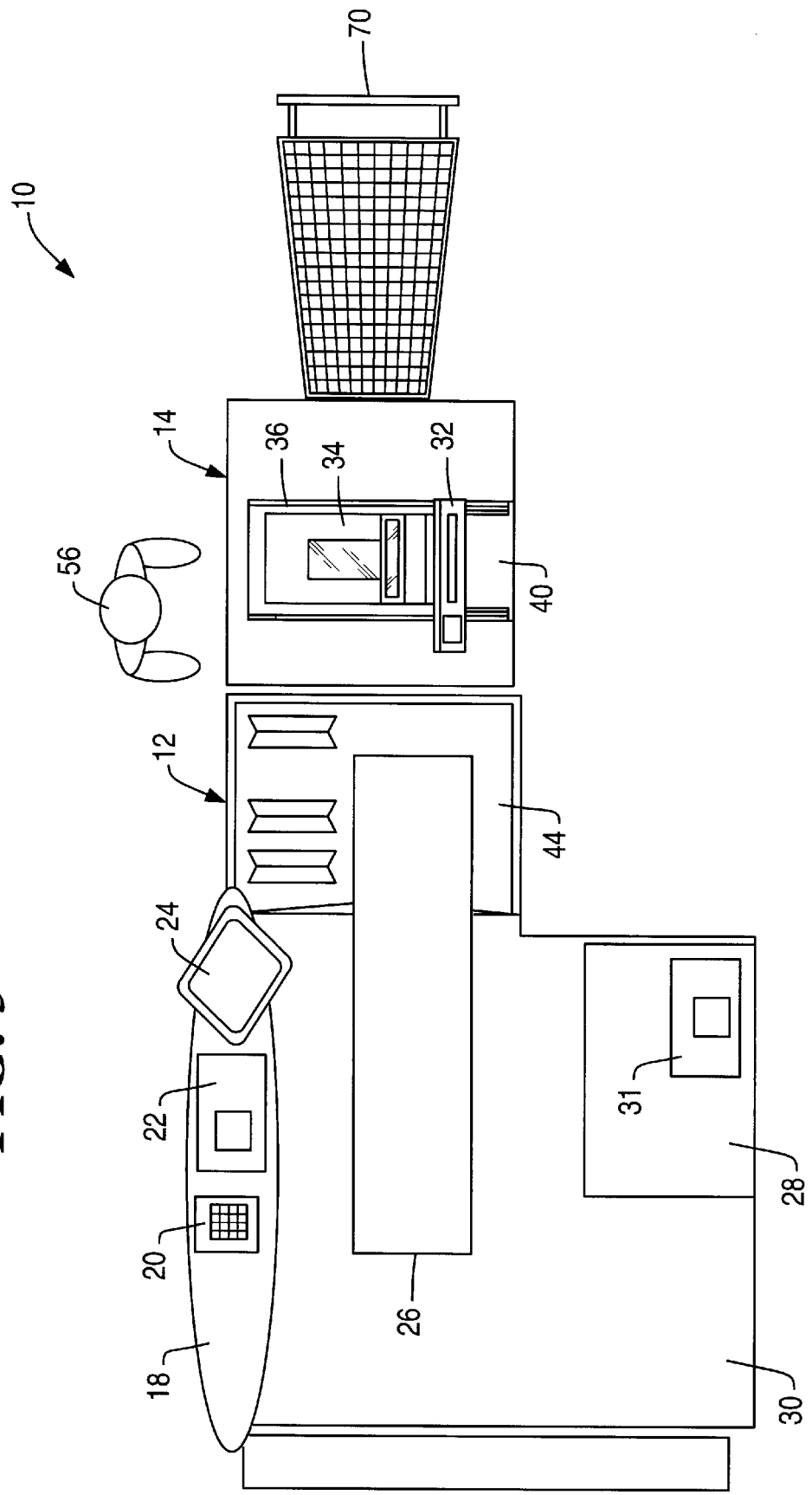
FIG. 5 is a top view of the checkout system of the present invention configured as a second type of self-service checkout island.

During self-service operation, customer 56 approaches receiving portion 16 and places merchandise items on conveyor 38 (FIG. 4) or places shopping cart 70 adjacent scanning portion 14 and removes items from shopping cart 70 to be scanned one at a time (FIG. 5).

Customer 56 looks to customer display 24 for instructions. Customer 56 scans barcoded merchandise items using dual-aperture bar code scanner 34. Customer 56 may alternatively process bar coded merchandise items by entering price look-up numbers into customer display 24. Customer 56 also processes non-barcoded items, such as produce items using the scale of dual-aperture bar code scanner 34 and customer display 24. Customer 56 moves all merchandise items to portion 44 of bagging portion 12.

Customer 56 moves to customer service table 18 after processing all items to complete payment. Payment may be recorded by card reader 20. Cash or check payments may be made at a separate payment station. Alternatively, system 10 may include a cash acceptance/cash dispenser unit controlled by terminal 42. Following payment, receipt printer 22 prints a receipt. Customer 56 then removes the items from portion 44 of bagging portion 12.

Advantageously, system 10 provides an ergonomically superior arrangement for the checkout process. The reconfigurable hardware solution provides a self-service option while preserving full-service checkout capability. Most importantly, system 10 allows dual-aperture bar code scanner to be used in both self-service and full-service configurations.

Although the present invention has been described with particular reference to certain preferred embodiments thereof, variations and modifications of the present invention can be effected within the spirit and scope of the following claims.

What is claimed is:

1. A reconfigurable checkout system comprising:

a first portion having a full-service side and a self-service side opposite the full-service side and including
   a dual-aperture bar code scanner rotatably mounted within the first portion;
   wherein the dual-aperture bar code scanner is rotatable in a substantially horizontal plane between a full-service position on the full-service side and a self-service position on the self-service side; and a second portion coupled to the first portion containing a bagging area for use in full-service and self-service checkout operations.

* * * * *